Sept. 30, 1958 G. R. SANDERS 2,853,796
METHOD AND APPARATUS FOR DEHYDRATION
OF HEAT SENSITIVE SUBSTANCES
Filed Oct. 29, 1954 3 Sheets-Sheet 1

INVENTOR
GEORGE R. SANDERS
BY
Gardner & Zimmerman
ATTORNEYS

Sept. 30, 1958　　　G. R. SANDERS　　　2,853,796
METHOD AND APPARATUS FOR DEHYDRATION
OF HEAT SENSITIVE SUBSTANCES
Filed Oct. 29, 1954　　　3 Sheets-Sheet 2

INVENTOR
GEORGE R. SANDERS
BY
Gardner & Zimmerman
ATTORNEYS

Sept. 30, 1958 G. R. SANDERS 2,853,796
METHOD AND APPARATUS FOR DEHYDRATION
OF HEAT SENSITIVE SUBSTANCES
Filed Oct. 29, 1954 3 Sheets-Sheet 3
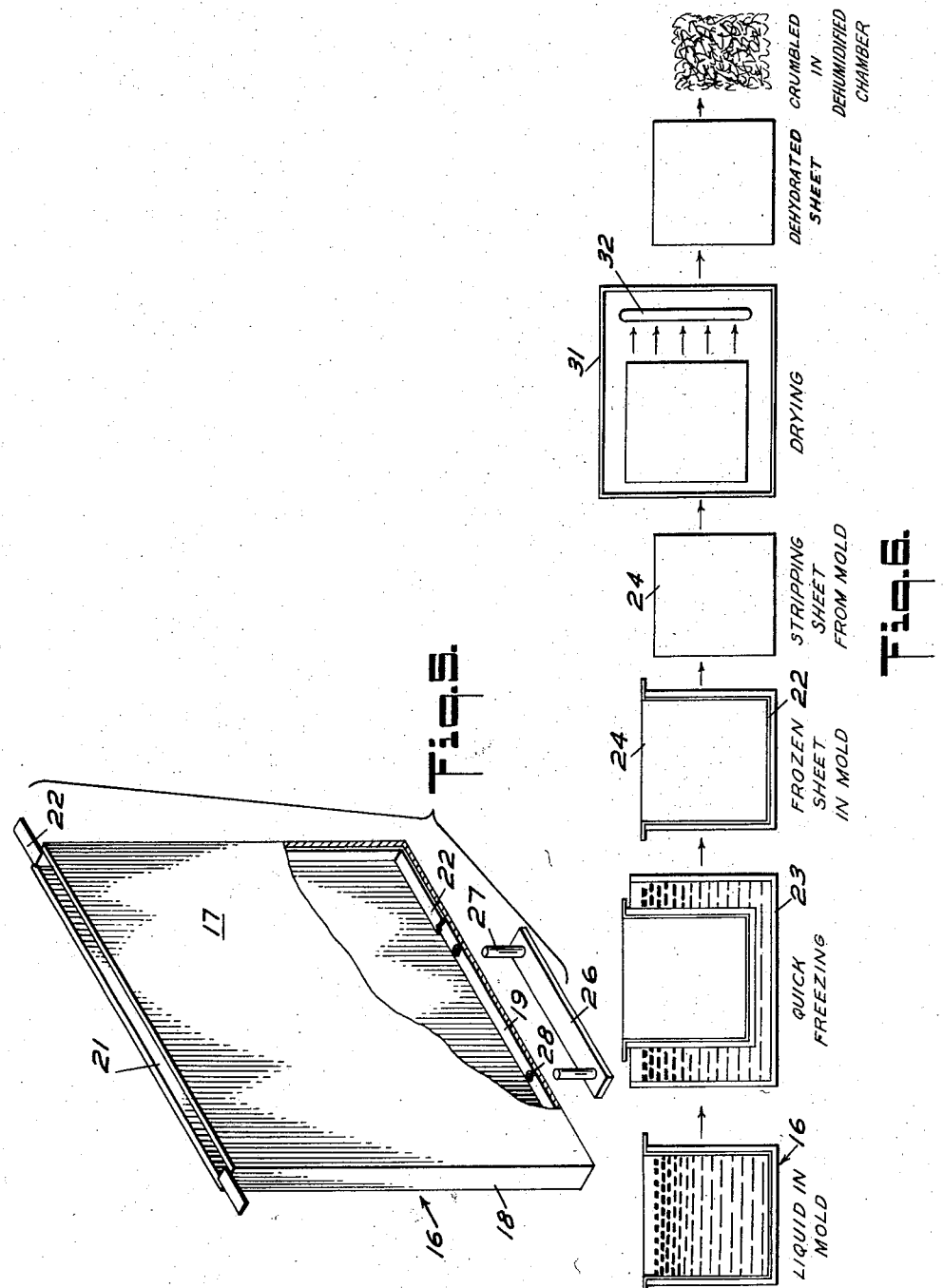
INVENTOR
GEORGE R. SANDERS
BY
ATTORNEYS

United States Patent Office 2,853,796
Patented Sept. 30, 1958

2,853,796

METHOD AND APPARATUS FOR DEHYDRATION OF HEAT SENSITIVE SUBSTANCES

George R. Sanders, El Cerrito, Calif., assignor, by direct and mesne assignments, of two-thirds to Wallace B. Truslow, San Francisco, Calif.

Application October 29, 1954, Serial No. 465,630

14 Claims. (Cl. 34—1)

This invention relates to a method and apparatus for dehydrating heat sensitive products such as fruit juices, milk, and other liquid-containing substances, and is more particularly directed towards a process and apparatus for freeze drying or lyophilization of such material.

The drying of products in their frozen state, sometimes referred to as drying by sublimation, is not a new concept, and numerous processes have been developed around the same. However, as is well known, the success of any process must be measured in terms of the finished product, and it has been found, particularly where food products are concerned, that the presently available freeze drying methods and apparatus produce a desiccated non-sterile material possessing residual moisture, resistant to reconstitution, having a scorched or otherwise impaired flavor, and require too long a period of time to produce to permit their use on a commercial scale. Some of the reasons for these deleterious results will be hereinafter discussed in connection with a consideration of the teachings of this invention.

It is a primary object of the present invention to provide a method and apparatus for dehydrating heat sensitive products by sublimation which is rapid in action and which will produce a desiccated product of minimum water content, improved taste, bacterio static, and readily soluble in water.

Another object of my invention is to provide a process and apparatus as above mentioned in which an optimum differential of vapor pressures between the product and the water-collecting means is accurately maintained during all phases of the drying cycle.

A further object of the invention is to provide a process and apparatus of the character described in which the water molecules travel along a free and unrestricted path from the product to a condenser, and in which means are provided for maintaining an optimum temperature at the condenser notwithstanding the collection of ice thereon.

A still further object of my invention is to provide a process and apparatus of the above type in which the product temperature is maintained at a higher temperature than that of the condenser unit so as to permit the transfer of water molecules to the latter, and at a sufficiently low temperature so as to prevent the water of crystallization molecules from locking with the product molecules and impeding their separation from the latter, and in which an optimum temperature differential may be maintained.

Yet another and an important object or feature of the present invention is the supplying of energy to maintain the product at an optimum temperature, such energy affecting a molecular distortion in the frozen product without conventinal kinetic heating thereof.

A still further object of the invention is to provide a process and apparatus for freeze drying a product in which the product retains its original shape and volume during the sublimation process without bubbling, foaming or softening as is common with presently available methods of lyophilization.

Another object of this invention is to provide a process and apparatus of the character described in which the frozen product presents a maximum surface area to the water collection means or condenser so as to permit rapid and efficient transfer of the water of crystallization from the crystalline solids of the product to the condenser.

Yet another object of the invention is to provide improved apparatus for carrying out a freeze drying process which is simple in construction and operation, which will adequately discharge the collected ice or moisture taken from the product, and which permits the entire process to be carried on at optimum temperature and pressure conditions.

The invention possesses other objects and features of advantage, some of which, with the foregoing, will be set forth in the following description of the perferred form of the invention which is illustrated in the drawings accompanying and forming part of the specification. It is to be understood, however, that variations in the showing made by the said drawings and description may be adopted within the scope of the invention as set form in the claims.

Referring to said drawings:

Figure 5 is a perspective view of mold apparatus in which the product may be initially placed and frozen.

Figure 6 is a diagrammatic flow diagram illustrating the main steps in the process of the present invention.

Figure 1:
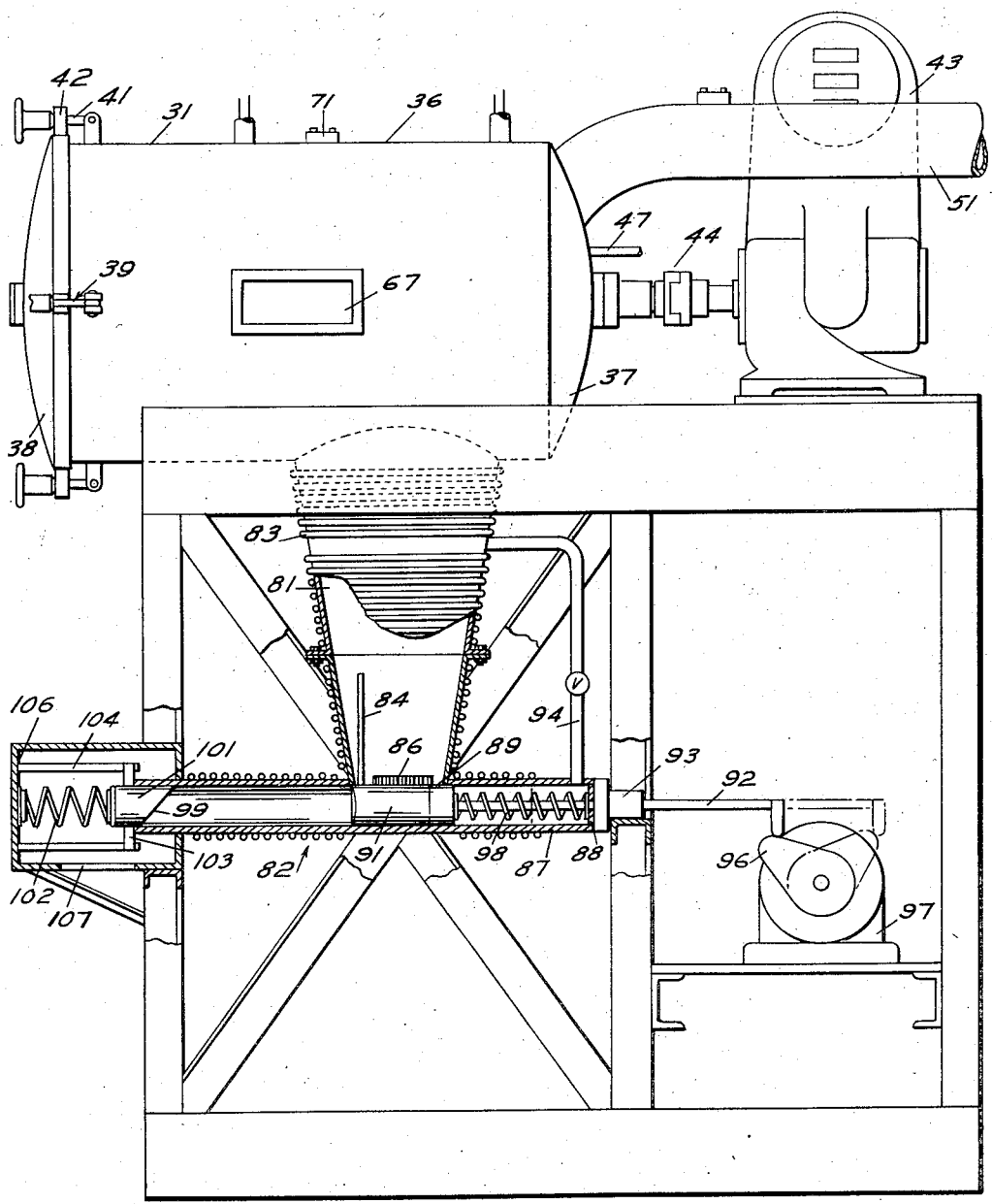
Figure 1 is a side elevational view of apparatus for carrying out the freeze drying process of this invention.

As hereinabove mentioned, the drying of products in their frozen state, generally referred to as drying by sublimation, freeze drying, or lyophilization, results from an initial freezing of the product and subsequent removal of the frozen water from the product by sublimation, the latter in conventional processes being effected by supplying the heat of sublimation to the product, resulting in moisture vapor being freed and being attracted to a moisture collector such as a desiccant or condenser. The present invention utilizes the phenomena above described, but by means of temperature and pressure controls, by supplying the "heat" of sublimation in a novel manner, and by providing a maximum product surface area and a mean free path for the escaping water molecules, my apparatus and process is capable of dehydrating heat sensitive products in an extremely efficient and reliable manner. For purposes of explanation, the process will be described in connection with the freeze drying of orange juice inasmuch as the drying of this product presents numerous difficulties not encountered with many other water-containing substances. Some of such difficulties pertain to the taste or flavor, odor, retention of vitamin content, and solubility in water for reconstitution; but it will be appreciated that the teachings of the invention are equally applicable to the dehydration of other heat sensitive products such as miscellaneous fruit juices, milk, and other products.

In broad terms, in carrying out the present process, the unconcentrated product is first flash frozen in relatively flat sheets so as to produce a maximum surface area for a given volume. The frozen sheet is then placed in a vacuum chamber having a condenser therein maintained at a temperature substantially lower than the product temperature. This differential in temperatures results in the vapor pressure of the product being much greater than the vapor pressure of the condenser, and results in the migraton of the water molecules from the frozen product to the condenser. Energy must be supplied to the product to prevent a decrease in product temperature and resulting equilibrium with the condenser temperature, such energy being in the nature of an oscillating magnetic field, affecting a molecular distortion throughout the product and hence molecular friction and maintenance of a constant temperature and vapor pressure.

More specifically, the process may now be described in connection with the apparatus disclosed in the accompanying drawings.

The first step in the process comprises the freezing of the unconcentrated natural juice or other product. In this connection, it should be pointed out that while freezing may ordinarily be carried out in several manners, in accordance with my invention, the juice is flash frozen to a temperature preferably less but no greater than −20° C. Flash freezing is not utilized merely from a time saving factor, but I have found that flash freezing provides for a more efficient separation of the water of crystallization from the sugars or other crystalline solids in the product. In other words, if the juice is slowly frozen, the separation phenomena fails to occur, the water of crystallization is not necessarily in crystalline form, and the task of subsequently separating the water from the solids is materially increased. Preferably, the product is brought to a temperature of approximately −30° C. so that in transferring the product to the desiccating chamber, it will not exceed −20° C. by heat absorption from the atmosphere.

A temperature in the range of −20° C. to −40° C. may be reached in approximately two minutes by limiting the thickness of the product to about ⅜ inch and by immersing the product in a bath of methyl alcohol, acetone or the like having a temperature of −90° C.

As will be later made clear, when the frozen product is placed in the vacuum condenser chamber it is desirable to have the product in such a form as to permit ready and rapid migration of the water molecules from the product to the condenser, while at the same time permitting energy to be conveniently applied so as to create a rapid molecular distortion throughout the product. Accordingly, I prefer to initially freeze the juice into flat sheets, measuring approximately 12 inches square by ⅜ inch thick. This size has been somewhat arbitrarily selected, but it will be appreciated that it will accomplish several desirable results. First, the relatively small thickness will permit a desirable quick freezing of the liquid and likewise will subsequently permit more rapid sublimation. Secondly, the flat thin sheets expose a maximum surface area for a given volume to the atmosphere of the vacuum chamber. Finally, these dimensions permit easy manually handling of the sheets, and do not require unwieldy mold apparatus or a very large vacuum chamber. It will be understood, however, that the recited dimensions are not intended to be critical, but rather illustrative, as sheets of other sizes could be also used.

Apparatus for quick freezing the unconcentrated juice as above described is best illustrated in Figures 5 and 6 of the drawings. As illustrated, the apparatus includes a mold, generally indicated by the numeral 16 into which the product is poured. The mold includes side walls 17, end walls 18, a bottom wall 19, the said walls defining a mold chamber 21 having an open top portion. In order to avoid making the mold collapsible, other means may be provided to permit the removal of the frozen product from the mold. Such means may include a thin and flexible metal band 22 arranged to be positioned in the mold chamber as shown in Figure 5 prior to the introduction of the product therein. The band is positioned substantially immediately adjacent the end and bottom walls to form an inner covering therefor.

After the product is poured into the mold, the mold is supported in a tank 23 containing methyl alcohol or the like at a temperature of approximately −90° C. so that the product will be quickly frozen. The mold is then withdrawn from the tank and the frozen product separated therefrom.

The stripping of a frozen sheet 24 from the mold 16 may be readily accomplished by slightly raising the temperature of the mold as by dipping the same in water to reduce the bond between the sheet and mold. Then, a die 26 having punch-out plugs 27 movable through apertures 28 in bottom wall 19 is advanced towards said bottom wall urging the frozen sheet and band 22 upwardly and out of the mold chamber. The band is readily removable from the sheet edges and the frozen sheet 24 is now ready to be placed in the vacuum chamber wherein the drying of the sheet by the phenomena of sublimation will take place.

It is in the vacuum chamber, generally indicated by the numeral 31 in the drawings, that the most important portions of my process occur. For the present, disregarding the specific apparatus illustrated, the frozen sheets are placed in the vacuum chamber which is evacuated to the lowest possible pressure, preferably in the neighborhood of one micron of mercury. A condenser 32 is positioned within chamber 31 adjacent the sheet and the temperature of the condenser is maintained at approximately −60° C. The vapor pressure on the condensing surface is of course proportional to the condenser temperature, and a temperature of −60° C. will yield a vapor pressure of 8 microns of mercury. In distinction to this, the vapor pressure of the product at −20° C. is 776 microns of mercury, thereby establishing a pressure differential of some 768 microns.

This pressure differential results in the distillation of the water molecules, and by placing the condenser adjacent the product and in the mean free path of the water molecules, the latter will migrate from the product and condense on the condenser surface in the form of ice.

It will be understood that by decreasing the condenser temperature, the vapor pressure at the condenser surface will be proportionately decreased and it is therefore desirable to maintain the condenser at the lowest possible temperature. While a −60° C. temperature will permit efficient operation, it is not recommended that the temperature be permitted to rise above this level. Actually, a temperature in the range of −90° C. or lower will provide the optimum operating conditions of vapor pressure and temperature at the condenser surface.

In view of the fact that the water molecules from the product are condensing on the condenser, the accumulation of ice thereon would act as an insulator, reducing the efficiency of the condenser, raising its temperature and consequently the vapor pressure, and reducing the optimum vapor pressure differential existing between the product and condenser. Accordingly, as will be later described in detail when the apparatus per se is described, means are provided for continuously removing the water molecules which collect on the condenser surface and ejecting such ice from the chamber. It is important to note that the mere removal of the ice from the condenser is insufficient to provide optimum operating conditions, as the removed ice must be maintained at the condenser temperature. Thus, the ice ejection process must be carried out under temperature conditions approximating that of the condenser. Otherwise, the temperature and vapor pressure of the ice would rise to a point above that maintained at the condenser surface with a resulting recondensing of the water molecules from the ice on the condenser. This would obviously be an undesirable procedure and would reduce the efficiency of the condenser.

Returning again to the product in the vacuum chamber, in accordance with my invention, means are provided for maintaining its temperature at substantially —20° to —30° C. at which it was introduced to the chamber. More particularly, in order to retain optimum temperature and vapor pressure conditions, external energy is supplied to the product. If this energy was eliminated, as the water molecules would leave the sheets 24, a super cooling phenomena would occur, resulting in a decrease in product temperature until a state of equilibrium was reached with the condenser temperature and the sublimation process would thereupon terminate.

Accordingly, external energy or heat must be provided for the product. In conventional terms, heat by radiation, conduction or other kinetic heating could be theoretically utilized, but numerous disadvantages would result. First of all, the supplying of energy or heat to the outside of the product and permitting it to work into the inside of the product is most inefficient as the specific heat of the solids in the juice or other frozen liquid is substantially less than the specific heat of ice, and obviously the evaporation commences from the outer surface of the product and works inwardly. Also, kinetic heating has a strong tendency to scorch the product and/or impair its natural flavor, while at the same time being very difficult to control. If the applied energy caused any substantial rising of product temperature above approximately —20° C., the sugars or other crystalline solids would regain their affinity for the water of crystallization, which at the desired temperature is in crystalline form, and the product would become puffy and plastic, foaming or bubbling would occur, and sublimation would be questionable.

Therefore, to avoid the foregoing deleterious results, I supply the necessary energy to the sheets by subjecting the latter to a rapidly oscillating magnetic field or to high frequency radio waves. Molecular distortion and oscillation is thereby induced which results in uniform heat formation throughout the product for maintaining the latter at its desired optimum temperature. Thus, the control of the "heat" is simplified and uniform, and there is no danger of scorching or otherwise impairing the flavor of the product.

Figure 2:
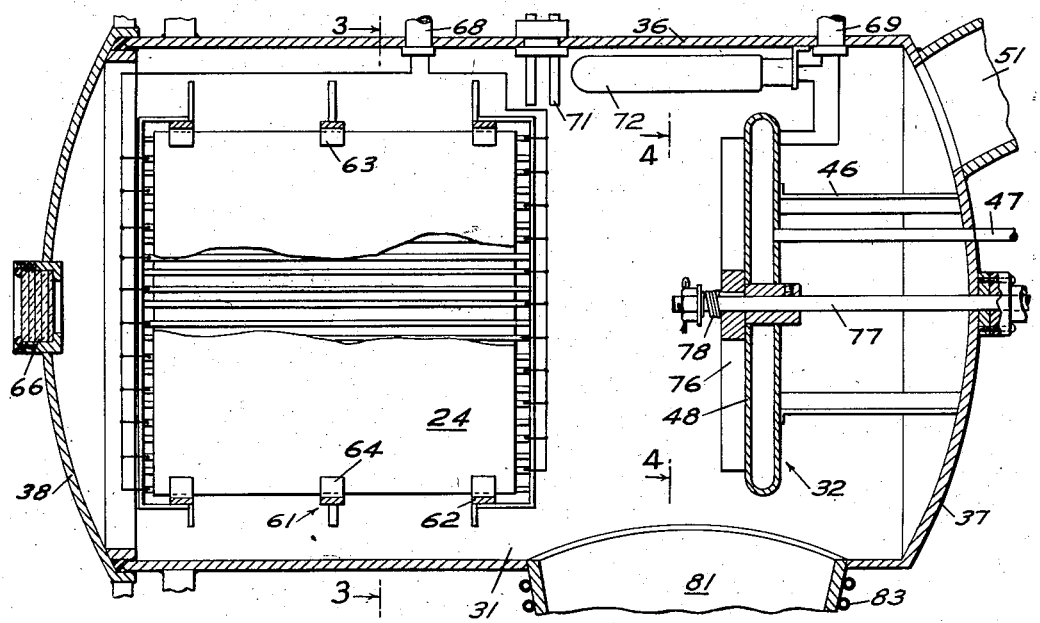
Figure 2 is a cross-sectional elevational view of the drying chamber shown in Figure 1.
Figures 3, 4:
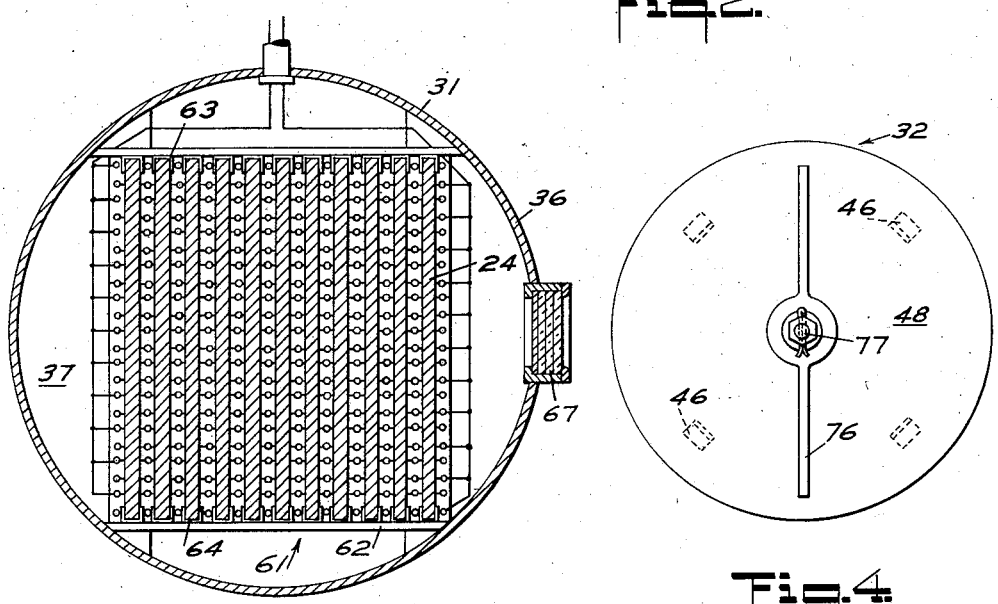
Figure 3 is a cross-sectional view taken substantially in the plane indicated by line 3—3 of Figure 2.
Figure 4 is a cross-sectional view taken substantially in the plane indicated by line 4—4 of Figure 2.

Apparatus capable of carrying out the freeze drying of the sheets 24 as above described is disclosed in Figures 1 through 4 of the drawings. As will be seen, vacuum chamber 31 is preferably of cylindrical form and is defined by a casing 36 having a rear end wall 37 and a front end closure 38. The latter is pivotally attached to the casing as shown at 39 for opening and closing of the latter and may be locked in its closed position by pivotally mounted bolts 41 and slotted lugs 42 co-operating in a manner well known in the art.

The previously discussed condenser 32 is positioned in the rear portion of chamber 31 on the longitudinal axis thereof, and includes an external drive motor 43, a suitable drive coupling 44, supporting frame 46, refrigeration line 47, and other accessories of a type well known in the art, and therefore no detailed explanation of the condenser apparatus or mode of operation is believed warranted. As will later be made clear, the front surafce 48 of the condenser provides the area to which the water molecules from the sheets 24 migrate and are condensed, and this surface is maintained at a temperature of substantially no greater than and preferably less than —60° C.

To produce a vacuum in the chamber, a relatively large pipe 51 is caused to enter rear wall 37, and by connecting the latter to a suitable vacuum pump or the like, not shown, the necessary and desired atmosphere may be created and maintained in the chamber, such atmosphere being as close as possible to a perfect vacuum, and with presently available commercial equipment, it is not too difficult to establish a 1 micron of mercury residual air pressure.

Means are provided for supporting a plurality of the frozen sheets 24 in the chamber 31 so that there is a clear path between the sheets and condenser surface 48 to provide a mean free path for the migrating water molecules. While the exact structural arrangement is not critical, I have illustrated the supporting means as including a rack 61 suitably supported within casing 36 by suitable framing 62. The rack includes a plurality of opposed upper and lower sets of channel members 63 and 64 respectively, with each set being spaced from its adjacent set for a purpose presently to be described. As will be understood each set of channel members is arranged to slidably receive and support a frozen sheet 24 as the latter is introduced into the chamber through door 38. Thus, if each sheet has the previously discussed 12" x 12" x ⅜" dimensions, and with the chamber of approximately 17-inch inside diameter, approximately eleven sheets may be accommodated during each cycle of operation.

Glass ports 66 and 67 may be provided to permit ready visual inspection of the chamber during operation. Likewise, suitable conduits 68 and 69 leading to the rack and condenser respectively are incorporated to permit temperature readings by well known instruments, and a vacuum gage 71 permits a reading of the residual air pressure in the chamber. A light 72 may be utilized so as to facilitate internal operating inspections.

With the sheets positioned in the rack 61, a vacuum induced in the chamber 31, and the condenser in operation, the distillation will be initiated due to the vapor pressure differential between the product and condenser. As there are not obstructions or constructions between the sheets and condenser surface 48, the mean free path of the water molecule is completely unrestricted, and the water molecules will be condensed on the condenser surface. As was previously explained, the condenser water will form as ice on the condenser surface 48, and if permitted to remain thereon, would act as an insulator seriously impairing and eventually halting the sublimation process. Accordingly, means are incorporated in the disclosed apparatus for continuously removing the ice from said surface. Such means include a scraper blade 76 positioned against surface 48 and moved across the same by a driven shaft 77. A spring 78 resiliently urges the blade against said surface so that as ice is collected on the latter, it will be scraped off by the rotating blade 77.

Disposed subjacent the condenser is a hopper 81 communicating at its upper end with chamber 31 and at its lower end with an ice ejection mechanism 82 to be presently described. The hopper and ejection apparatus are both maintained at a temperature equivalent to that of the condenser temperature for the reasons hereinabove explained by means of refrigeration coils 83. It will be appreciated that the ice must be ejected without disturbing the vacuum in the chamber and mechanism 82 is constructed with this principle incorporated therein.

As ice is scraped off from condenser surface 48, it falls into hopper 81, the latter having an agitator 84 mounted at the bottom thereof. The agitator may be driven in any suitable manner by a drive mechanism 86. The ejection apparatus includes a horizontally extending cylinder 87 having a closed end 88 and an upwardly directed opening 89 communicating with hopper 81. A piston 91 is slidably mounted in the cylinder and is arranged for reciprocation between a first position, shown in solid lines in Figure 1 wherein the piston blocks off opening 89 and a second or rearward position, indicated by dot-dash lines, to permit communication between the hopper and cylinder.

To provide for such movement, the piston is provided with a rearwardly extending piston rod 92 extending through end 88, a suitable vacuum seal 93 being utilized to prevent the breaking of the vacuum. It will also be noted that a conduit 94 interconnects hopper 81 and the rear portion of the cylinder to maintain the latter at the desired low pressure and temperature notwithstanding the compression action of the piston in such portion. The rod, and consequently the piston, is reciprocated by means of a cam 96 driven by a motor 97, a spring 98 being used to insure prompt forward movement of the piston when the cam permits such action.

From the foregoing description, it will be understood that when the piston is in its rearward position, ice will fall into the cylinder 87 and upon forward movement of the piston, the ice will be pushed towards the front end of the cylinder. This cycle of operation is continued until the forwardly moved ice engages the angular face 99 of a front plug 101 which is resiliently urged into telescopic engagement with the cylinder by a spring 102. Entry of the plug is limited by a shoulder 103 on the plug and the latter is mounted for axial movement on a pair of rails 104.

When the ice reaches the plug, the plug will be moved forwardly until it engages a wall 106, and the subsequent piston movement will cause the ice to break off in a downward direction and be ejected through an opening 107 in a casing 108 surrounding the forward end of the cylinder. It will be appreciated that the plug 101 prevents air from entering the cylinder, and once the operation commences, the ice will form an effective barrier against the entry of outside air.

Thus, as ice is formed on condenser surface 48, the scraper blade causes the ice to fall into the hopper 81, with the ice ejection mechanism continuously removing the ice from the system by maintaining the condenser, hopper and mechanism 82 at substantially the same temperature and pressure, and efficiency of the sublimation process will be maintained at a high level.

Once again referring to the frozen sheets 24, it will be recalled that molecular distortion and oscillation is induced to create the necessary heat to maintain the sheets at approximately −20° C. without danger of super cooling due to water leaving the sheets or a rise in temperature due to more conventional forms of heating by kinetic means. In accordance with my invention, I provide the desired molecular disturbance and "heat" by passing high frequency radio waves through the product, such waves being easily controlled so as to likewise control and maintain the product temperature at its desired level. As each sheet actually constitutes a separate installation, electrodes are positioned on each side of the respective sheets so that the waves will fully penetrate through each sheet. To insure complete and uniform induction of heat, I prefer to use a plurality of finger or stray field type of electrodes between each sheet. In this manner each set of electrodes, containing a positive electrode 116 and negative electrode 117 will create a separate magnetic field sufficiently wide to pass through the adjacent sheets. While other forms of dielectric heating could be used, the arrangement disclosed has proven to be most satisfactory in operation.

With the foregoing method and apparatus in operation, as the last traces of water leave the sheets, the product will be dry but no longer frozen. However, the sheets will retain their original shape and volume, the color being lighter than when the sheet was introduced into the chamber as water enhances the pigmentation. The product may then be removed from the chamber and ground or otherwise pulverized or powdered in a dehumidified room and suitably packaged. The powdered material is bacterio-static and its final moisture content is estimated to be approximately 0.01 percent. Notwithstanding the omission of artificial preservatives the product will keep indefinitely at normal room temperatures.

Upon reconstitution, the product is readily soluble in water, the natural flavor and original vitamin content are retained, and the fresh product color is regained.

Thus, from the foregoing description, it will be seen that the method and apparatus of this invention is very effective, yet sufficiently simple to permit its use on a commercial level.

What is claimed is:

1. The method of dehydrating a heat sensitive product by sublimation which comprises quickly freezing said product to a temperature of about −20° C. with the frozen product in a relatively thin sheet, placing each of the opposed surfaces of said sheet in adjacent relationship to a condenser surface having a temperature of about −60° C., producing a sub-atmospheric pressure around said sheet and condenser, substantially maintaining said sheet and condenser surfaces at their respective temperatures whereby the vapor pressure differential therebetween results in migration of water molecules to the condenser from the sheet surfaces along an unrestricted mean free path of minimum length, and removing condensed ice from said condenser surface and from the influence of said sub-atmospheric pressure without increasing the latter.

2. A method of dehydrating a heat sensitive product by sublimation which comprises freezing the product into a relatively thin sheet and at a temperature substantially no greater than −20° C. thereby effecting a separation of the water of crystallization from the crystalline solids of the product, placing a plurality of frozen sheets in vertical spaced relation and substantially at right angles to the front surface of a condenser, said condenser being in a chamber and the sheets having an unrestricted mean free path for travel of water molecules between opposed surfaces of said sheets and said condenser, evacuating said chamber to the minimum practicable residual air pressure, maintaining the condenser at a temperature in the general range of from −50° C. to −100° C., and supplying heat of sublimation to said sheets while substantially maintaining the temperature thereof by creating a magnetic field between each of the adjacent sheets.

3. A method as set forth in claim 2 in which ice forming on the condenser surface is continuously removed and ejected from said chamber to a position remote from the influence of said chamber and the vacuum in said chamber.

4. A method of dehydrating a heat sensitive product by sublimation which comprises freezing the product to a temperature of no more than −25° C. in a sheet like form providing maximum surface area for the volume thereof, placing said frozen product in a vacuum chamber in substantially immediate adjacent relationship to a condenser and with substantially the entire surface of said product defining with said condenser an unrestricted mean free path of travel for sublimed water molecules, maintaining the temperature of said condenser at no more than −50° C., continuously removing ice from said condenser and ejecting said ice from said chamber during the dehydration of said product.

5. A method as set forth in claim 4 in which said removed ice is maintained substantially at the temperature of said condenser until finally ejected from the chamber.

6. A method of dehydrating a heat sensitive product by sublimation which comprises rapidly freezing the product into a relatively thin sheet having a temperature substantially no greater than −20° C., placing said sheet into a vacuum chamber in adjacent relationship to a condenser with the opposed surfaces of said sheet each exposed to said condenser, maintaining the temperature of said condenser at substantially no greater than −60° C., whereby the vapor pressure of said sheet is substantially greater than the vapor pressure at the condenser, supplying energy to said sheet to provide inter molecular friction throughout the sheet for maintaining a substantially constant sheet temperature, and continuously removing ice from said condenser and ejecting the same from said chamber and from the influence of the vacuum and condenser therein.

7. A method of dehydrating a heat sensitive product by sublimation which comprises placing said product in a relatively flat mold, effecting a rapid freezing of said product in said mold into a relatively thin sheet having a temperature of approximately −30° C., removing said sheet from said mold, supporting said sheet on the edges thereof in a vacuum chamber in adjacent relationship to a condenser, maintaining the temperature of said condenser at substantially no greater than −60° C., whereby the vapor pressure of said sheet is substantially greater than the vapor pressure at the condenser, passing high frequency radio waves through said sheet for supplying the heat of sublimation while maintaining the temperature of said sheet at approximately −20° C., continuously removing ice from said condenser and ejecting the same from said chamber, and maintaining the temperature of said removed ice at substantially the temperature of said condenser until the ejection thereof from said chamber.

8. A method as set forth in claim 7 in which the condenser is maintained at a temperature of approximately −90° C.

9. A method as set forth in claim 7 in which substantially the entire surface area of said sheet is positioned so that the sublimed water molecules travel along an unrestricted mean free path of short length to the condenser.

10. Apparatus for dehydrating a frozen sheet of heat sensitive product by sublimation comprising a casing defining a chamber arranged to be evacuated, a condenser in said chamber adjacent an end thereof and having a front surface traversing the greater portion of said chamber, a removable closure adjacent the other end thereof through which said product may be introduced in the chamber, means adjacent said closure for supporting said product with substantially the entire opposed surfaces of the sheet exposed to said condenser, means for supplying energy to the product, and means for removing ice which forms on the condenser and ejecting same from said chamber and from the influence of said condenser and the vacuum in said chamber.

11. Apparatus as set forth in claim 10 in which said energy supply means includes a plurality of dielectric electrodes positioned substantially immediately adjacent the opposed side of said product.

12. Apparatus as set forth in claim 10 in which said last named means includes a scraper on said condenser for removing ice therefrom, a hopper communicating with said chamber subjacent said condenser, and means for automatically and substantially continuously ejecting ice from said hopper while maintaining a vacuum therein.

13. Apparatus for dehydrating a frozen heat sensitive product by sublimation comprising a casing defining a vacuum chamber having a front surface substantially normal to an axis of said chamber, a condenser mounted in said chamber, an access door in said casing through which said frozen product may be introduced into said chamber, means in said chamber adjacent said door for supporting a plurality of sheets of frozen product in parallel spaced relationship and substantially normal to said condenser surface, electrodes mounted within said supporting means and arranged to be positioned between adjacent sheets, means for scraping ice from said front surface of said condenser, and means for ejecting the scraped ice from said chamber.

14. Apparatus as set forth in claim 13 in which said ejecting means includes a tubular member positioned subjacent said casing, means establishing communication between the lower portion of said chamber subjacent said condenser to an upper portion of said member intermediate the ends thereof, a piston in said member, means for reciprocating said piston between a first position blocking communication between said chamber and member and a second position establishing such communication, and a spring-loaded seal normally covering the end of said member towards which the piston moves in travelling from said second position to said first position.

References Cited in the file of this patent

UNITED STATES PATENTS

| | | |
|---|---|---|
| 1,970,956 | Elser | Aug. 21, 1934 |
| 2,156,845 | Gentele | May 2, 1939 |
| 2,397,897 | Wenger | Apr. 2, 1946 |
| 2,406,682 | Hayes et al. | Aug. 27, 1946 |
| 2,513,991 | Bradbury | July 4, 1950 |
| 2,533,125 | Levinson et al. | Dec. 5, 1950 |
| 2,585,825 | Nyrop | Feb. 12, 1952 |
| 2,602,825 | Flosdorf | July 8, 1952 |
| 2,605,554 | Flosdorf | Aug. 5, 1952 |